United States Patent [19]

Planteline

[11] 4,313,414
[45] Feb. 2, 1982

[54] SHAFT POSITION SENSOR FOR AN INTERNAL COMBUSTION ENGINE EQUIPPED WITH AN ELECTRONIC IGNITION SYSTEM

[75] Inventor: Pierre Planteline, Paris, France
[73] Assignee: Thomson-CSF, Paris, France
[21] Appl. No.: 111,994
[22] Filed: Jan. 14, 1980
[51] Int. Cl.³ .............................. F02P 5/04; F02P 1/00
[52] U.S. Cl. .................................. 123/643; 123/618; 123/414; 123/617; 123/612
[58] Field of Search ............... 123/617, 414, 612, 643, 123/415, 416, 618

[56] References Cited

U.S. PATENT DOCUMENTS 4,112,895  9/1978  Habert .................................. 123/414
4,181,884  1/1980  Shirasaki ............................. 123/414

FOREIGN PATENT DOCUMENTS

1588968  9/1970  Fed. Rep. of Germany ...... 123/643

Primary Examiner—Ronald B. Cox
Attorney, Agent, or Firm—Roland Plottel

[57] ABSTRACT

Electromechanical sensing means comprising first of a set of members all of them substantially identical, arranged on an element turning synchronously with the engine's rotation and, second, of a pair of fixed detectors, placed in a protective casing for the turning element; the set of members including regularly spaced main members, in a number proportional to the number of the engine's cylinders, and at least one auxiliary member displaced at an angle $\phi_D$ at least equal to the lead angle $\phi_A$ to be controlled; the pair of detectors being positioned with regard to the course of the members and the relative angular interval in the two detectors being equal to the angle $\phi_D$; and an electronic means for processing the output signals of the detectors; these means being made up of three circuits; a coincidence circuit which combines the output signals of the two detectors and supplies an output signal S0 corresponding to the ignition cycle; a first logic circuit which receives the output signal of detector D1 and the output signal S0 of the coincidence circuit, and supplies an output signal S1 corresponding to the moments of passage of the pistons near the TDC and a second logic circuit which receives the output signal of detector D2 and the output signal S0 of the coincidence circuit and supplies an output signal S2 corresponding to the moments of passage of the pistons at a point anterior to the TDC.

5 Claims, 17 Drawing Figures

FIG_3-a

FIG_6

FIG_7

FIG_8

FIG_9

Fig_11

SHAFT POSITION SENSOR FOR AN INTERNAL COMBUSTION ENGINE EQUIPPED WITH AN ELECTRONIC IGNITION SYSTEM

TECHNICAL FIELD

The invention relates generally to the ignition system of a multi-cylinder, internal combustion engine. More specifically, in a preferred embodiment, this invention relates to an electronic ignition system having a shaft position sensor which provides a plurality of electrical signals to permit synchronization of the ignition system with the engine.

DISCUSSION OF THE PRIOR ART

An electronic ignition system for a multi-cylinder internal combustion engine requires an automatic advance circuit which, at a given instant of time determined by the engine's operation, provides electrical signals which make it possible, by means of a timing circuit, to fire spark generators sequentially, the outputs of the spark generators being connected to the spark plugs which are mounted in the engine's cylinders.

In an electronic ignition system, in order to ensure perfect operation of the automatic advance circuit under all operating speeds, automatic advance circuits have heretofore been employed. These automatic advance circuits are typically made up of two channels whose operation is mutually exclusive; a first channel that operates during the starting and idle speeds of the engine; and, a second channel that operates at cruising speed. In order to reduce by a factor of two the number of spark generators required, symetrical output spark generators have also been priorly employed.

In order to ensure the synchronization of an ignition system having an automatic advance circuit with double channel ignition and a timing circuit linked to a number of spark generators, it is necessary to have a piston or shaft position sensor, which provides three electrical signals synchronized to the engine's rotation. These signals are:

(1) a first signal indicating the instant when the pistons pass a point near Top Dead Center (TDC);

(2) a second signal identical to the first, the relative phase shift between the first and second signals being at least equal to the maximum lead angle to be controlled;

(3) a third signal to permit sequential triggering in cycle, of spark generators, whether symetrical outputs or not.

In addition, it would be desirable to be able to provide, on the basis of one, or a combination, of these signals, a continuous signal which is proportional to the rotation speed N of the engine, and, possibly, additional, two-state signals which are indicative of the engine's rotational speed, for example, the starting, idle, cruising and overdrive speeds, or an assigned speed.

U.S. Pat. No. 4,250,846 filed on Dec. 14, 1977, discloses the use of a piston position sensor linked to an engine exit shaft; this sensor delivers three electric signals, with the characteristics listed above. In this prior art sensor, metallic members are arranged on a disc rotated by the engine and a pair of angularly displaced detectors detect the passage of the members and provide two electric signals which are combined in a coincidence circuit to provide a reference signal for the engine's ignition cycle. In this type of sensor, there are two sets of members: a first set made up of short metallic segments and a second set made up of longer metallic segments the arc of which is at least equal to the maximum lead angle to be controlled.

A drawback to this type of sensor is that when the diameter of the disc to which the members are attached is large, and when the lead angle to be controlled is large and the length of the segments of the second set of members correspondingly long, this second set of members is subject to excessive mechanical strains, at high rotation speeds.

SUMMARY OF THE INVENTION

The purpose of the instant invention is to remedy the above defects by providing a piston position sensor in which all of the metallic members are identical and of small dimension.

One advantage of such a sensor is that the lightness of the members enables them to be placed on a disc having a larger diameter.

A second advantage is that the identical nature of the members simplifies the problems of large-scale production.

The present invention also contemplates a sensor whose electromechanical components can easily be integrated with the engine in that the members can be fixed by simple means to the flywheel of the engine or to the clutch disc, for example, and the detectors can be mounted in the protective casing of the flywheel or the clutch.

Other characteristics and advantages of the invention will appear from the detailed description which follows. This description will refer to the annexed drawings, which represent an illustrative embodiment of the invention. These drawings are provided for explanatory purposes but are in no way intended to be limiting.

BRIEF DESCRIPTION OF THE DRAWING

FIG. 1b represents the timing diagrams of the output signals generated by the sensor in FIG. 1a;

FIG. 9 represents, in the form of a simplified synoptic diagram, an alternative embodiment of the shaft position sensor shown in FIG. 2a;

DETAILED DESCRIPTION OF THE INVENTION

In the following description, it will be assumed that the basic operation of a multicylinder internal combustion engine is well known. Such information is widely available in standard technical works.

Figure 1A:
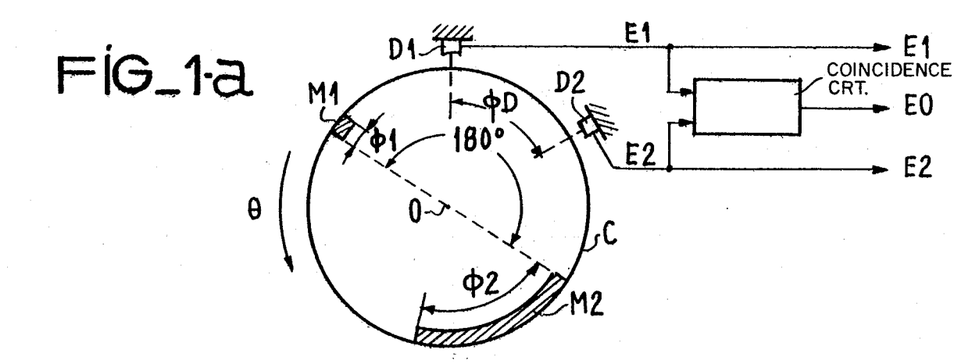
FIG. 1a represents, in the form of a functional diagram, a prior art shaft position sensor.

FIG. 1a represents, in simplified schematic form, a prior art sensor intended for an engine having two groups of two cylinders, with two symetrical outputs spark generators. This sensor comprises essentially:

(1) a disc C rotated around a central axis O by the crankshaft of the engine. Two metal members are set on the edge of the disc, a member M1 having an arc $\phi_1$ and a member M2 having an arc $\phi_2$; the angular spacing between members M1 and M2 being equal to 180°;

(2) a pair of fixed detectors D1 and D2 positioned in regard to the course of members M1 and M2, the relative angular spacing between the two detectors being equal to an arc $\phi_D$. Detector D1 provides an output signal E1 and detector D2 provides an output signal E2.

(3) an electronic coincidence circuit having two inputs, one connected to the output of detector D1 and the other connected to the output of detector D2. The electronic circuit provides an output signal E0.

By construction, the relative angular spacing $\phi_D$ of the two detectors has a value greater than the maximal lead angle $\phi_A$ to be controlled, the value of arc $\phi_1$ being smaller than the value $\phi_D$ and the value of arc $\phi_2$ being greater than the value $\phi_D$. The direction of rotation of disc C is indicated by the arrow and means (not shown) are provided to adjust the relative angular phase between disc C and detectors D1 and D2.

Figure 1B:
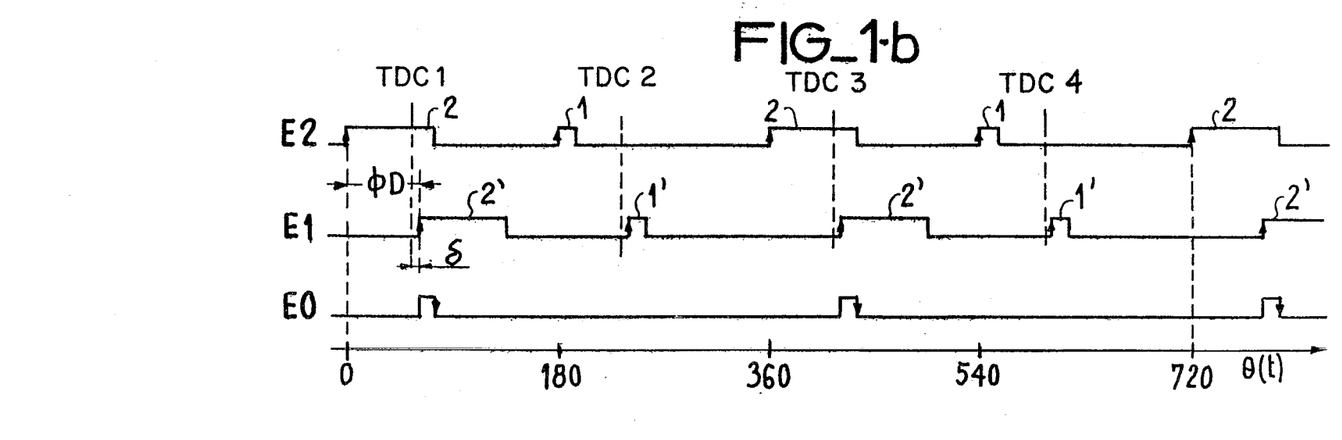

FIG. 1b represents the timing diagrams of the output signals from the sensor shown in FIG. 1a. It may be recalled that an ignition cycle of the engine corresponds to two revolutions of the crankshaft; consequently, a complete ignition cycle corresponds to a 720° rotation of disc C.

In FIG. 1b, the signal E2, considered during an ignition cycle, comprises two pulses 2, corresponding to the passage of member M2 in front of detector D2 and two pulses 1, corresponding to the passage of member M1 in front of detector D2.

Signal E1 comprises a sequence of pulses 1', 2' identical to pulses 1, 2, this sequence being retarded by a phase lag of angle $\phi_D$. Signal E0 results from the logical conjunction of signals E1 and E2. The leading edges of signals E1 and E2 define the instants of synchronization of the automatic advance circuit and the trailing edges of signal E0 can be used to synchronize a timing circuit of signals triggering the spark generators.

The TDC reference points situated near the leading edges of signal E1 are indicated by dotted lines in FIG. 1b, the lag between the TDC and the leading edges of signal E1 being equal to a static phase angle d.

Figure 2A:
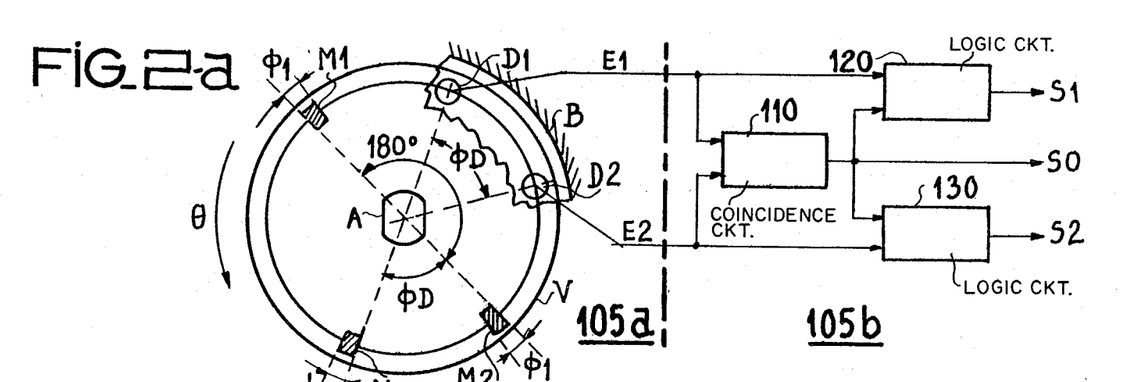
FIG. 2a represents, in the form of a functional diagram, an illustrative position sensor according to the invention.

FIG. 2a represents, in functional diagram form, an illustrative sensor, in accordance with the invention. As before, this sensor is intended for use in an engine having two groups of two cylinders, each group being fed by a paired secondary spark generator. This sensor comprises:

(1) electromechanical means 105a comprising three identical members; including: two main members, a member M1 and a member M2 diametrically opposed, and an auxiliary member M$\alpha$ identical to members M1 and M2, member M$\alpha$ being angularly displaced with respect to member M2 by an arc $\phi_D$; a pair of fixed detectors D1 and D2 whose relative spacing is equal to the angle $\phi_D$, already defined; and (2) electronic means 105b comprising three circuits: a coincidence circuit 110 having two inputs, one input being connected to the output of detector D1 and the other input being connected to detector D2; a first logic circuit 120, also having two inputs, one input being connected to the output of detector D1 and the other input being connected to the output of the first logic circuit 110; and a second logic circuit 130, also having two inputs, one input being connected to the output of detector D2 and the other input being connected to the output of the first logic circuit 110.

In FIG. 2a, the three members M1, M2 and M$\alpha$ are positioned on a rotating element V directly driven by shaft A of the engine's crankshaft. For example, the rotating element may comprise the engine's flywheel. The detectors D1 and D2 are placed in a housing B, which comprise the protective casing of the flywheel, partially represented in FIG. 2a. The output signals from detectors D1 and D2 are respectively signals E1 and E2, and the output signals from circuits 110, 120 and 130 are respectively signals S0, S1 and S2.

Figure 2B:
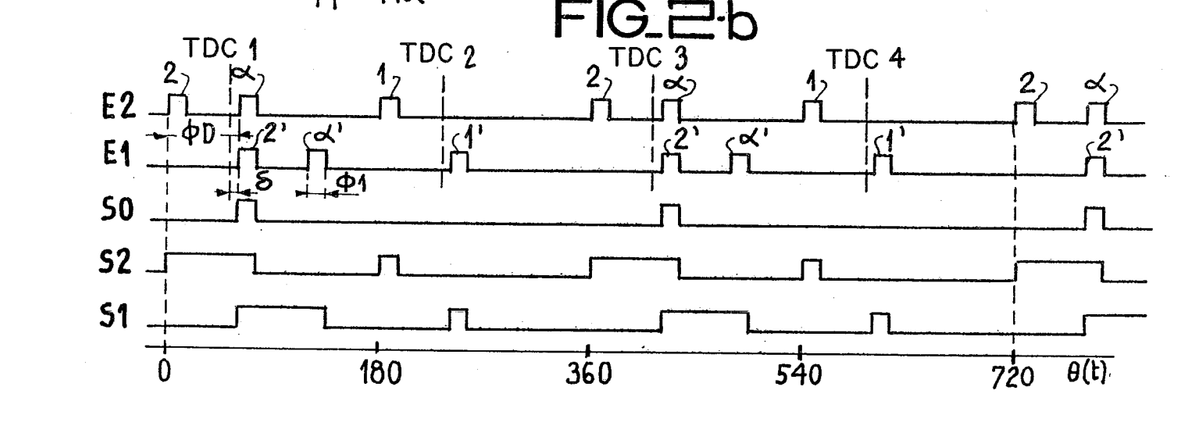
FIG. 2b represents the timing diagrams of the output signals generated by a shaft position sensor according to the invention.

FIG. 2b represents the timing diagrams of the signals generated by the sensor in FIG. 2a during one ignition cycle of the engine. Signal E2 is formed by the sequence of pulses 2, $\alpha$ and 1 resulting from the passage of members M2, M$\alpha$ and M1 past detector D2. Signal E1 is formed by the sequence of signals 2', $\alpha'$ and 1' resulting from the passage of the respective members M2, M$\alpha$ and M1 past detector D1. Signal S0 is the result of the logical conjunction of signals E1 and E2, while S2, generated by circuit 120, is the result of the logical combination of signals E1 and S0. The leading edges of signals S1 and S2 permit synchronization of the automatic advance circuits and the trailing edges of signal S0 permit synchronization of the electronic distributor the signals triggering the spark generators.

The frequency of the signals generated by the sensor is proportional to the speed of rotation N of the engine, thus these signals may be used to generate a signal representative of the speed of rotation N. The relative phase of signals E1 and E2 may also be used to determine the different rotation speeds of the engine. In this figure, the static phase-angle $\delta$ of the ignition is indicated with a negative value; it must be understood, however, that the value of this angle may be zero, positive or negative.

By construction, according to the model of engine under consideration, the members and detectors may be placed so as to agree with the timing of the ignition, thus a sensor of this kind will not necessarily require an auxiliary timing system. In FIG. 2a, the members have been represented as arc segments, however, the members can be designed in other ways, for example cylindrically, with or without flats. The members may be affixed by means of a threaded element screwed into the width of the flywheel's ground. The metal members may be constructed of the same metal as the rotating element on which the members are placed. Arc $\phi_1$ may be several degrees in size, and angle $\phi_D$ twenty or more degrees, with an extreme value of 90° in the model described. In practice, the diameter of element V is in the 150 to 300 mm. range.

Figures 3, 3B:
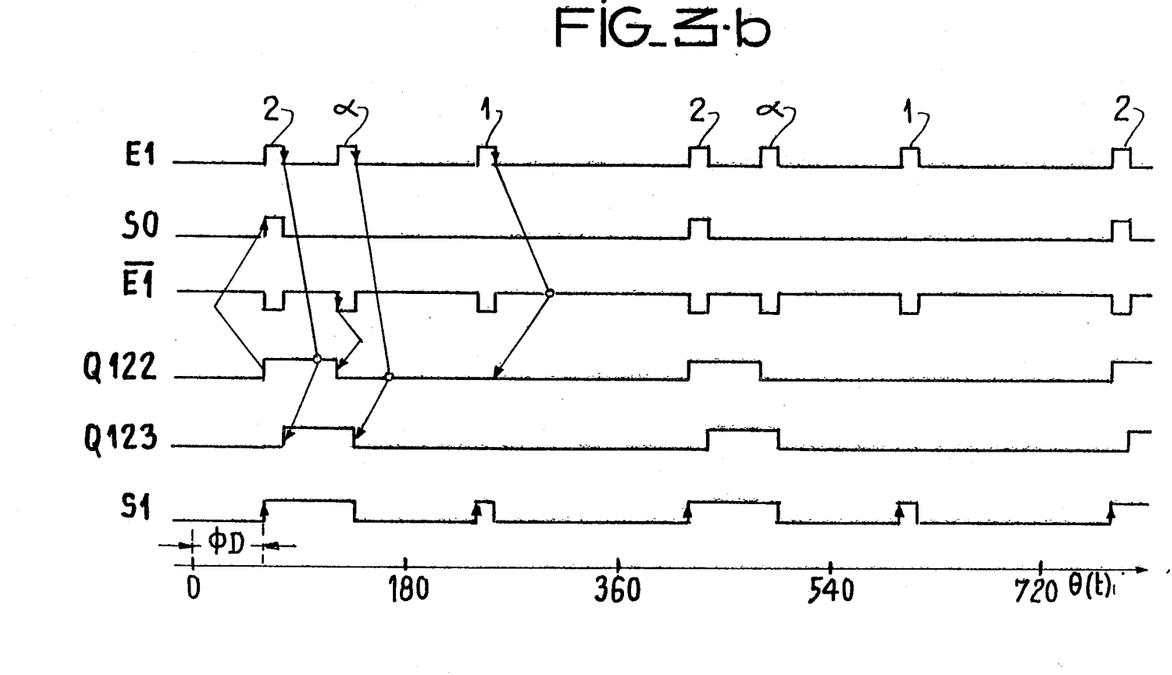
FIG. 3b represents the timing diagrams for the electronic signals generated by a first logic circuit in said electronic system.
Figure 3A:
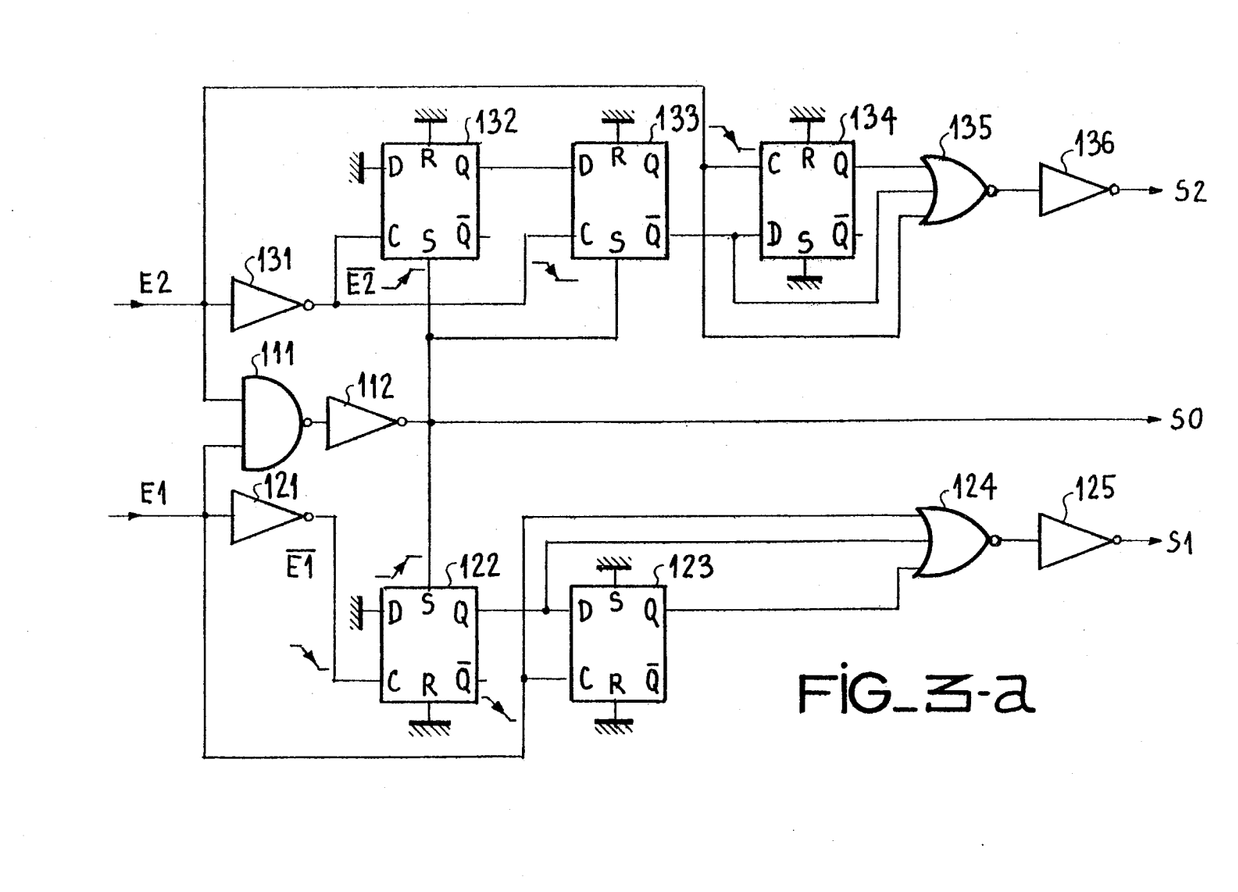
FIG. 3a represents, in the form of a schematic diagram, an illustrative electronic system for use with a shaft position sensor according to the invention.
Figure 3C:
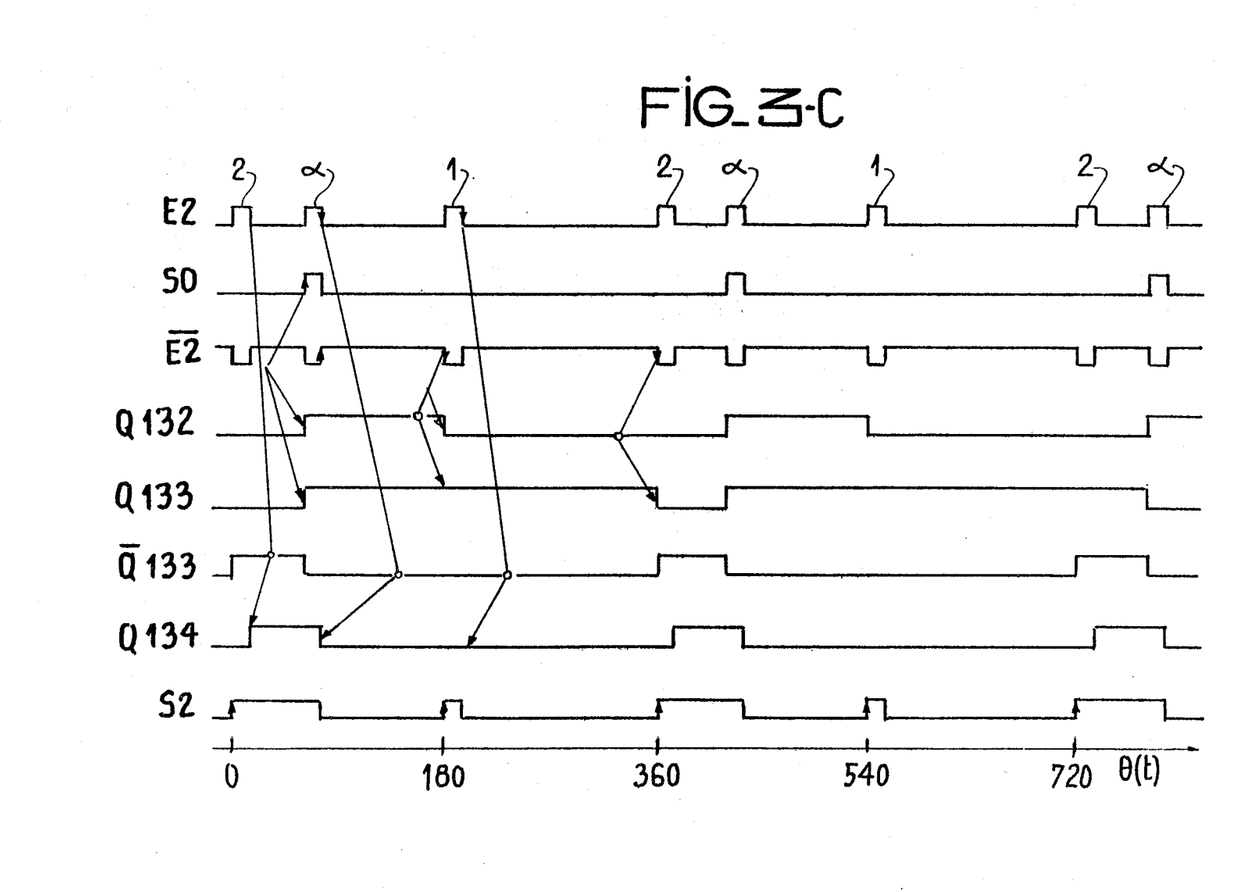
FIG. 3c represents the timing diagrams for the electronic signals generated by a second logic circuit in said electronic system.

FIG. 3a represents, in block schematic form, one illustrative embodiment of logic circuits 110, 120 and 130, shown in FIG. 2a. FIGS. 3b and 3c represent timing diagrams of the main input/output signals generated by the component parts of FIG. 3a.

In FIG. 3a, coincidence logic circuit 110 is made up of a NAND gate 111 having two inputs, one input receiving the output signal E1 of detector D1 and the other input receiving the output signal E2 of detector D2. The output of gate 111 is complemented by an inverter 112 whose output signal is signal S0.

Logic circuit 120 includes the following components: an inverter 121, two flip-flops 122 and 123, a NOR gate 124 and an inverter 125. The operation of circuit 120 will now be described with reference to FIG. 3b. The leading edge of signal S0, applied at input S of bistable circuit 122, sets output $Q_{122}$ in high level; the trailing edge of signal E1$\alpha$, complemented by inverter 121, is applied at input C of flip-flop 122 and samples the position of input D, which is referenced to the low level. Flip-flop 123, through its input C, samples input D, which is connected to output $Q_{122}$; by the action of the trailing edges of signal E1, pulses E1.2 thus set output $Q_{123}$ in high level and pulse E1.$\alpha$ sets this output $Q_{123}$ in low level. The logical conjunction at the three-input NOR gate 124, complemented by inverter 125, of the three signals E1, $Q_{123}$ and $Q_{124}$ supplies the output signals S1; the leading edges of the pulses of signal S1 provide the effective signals of synchronization of the automatic advance circuits.

Logic circuit 130 includes the following components: an inverter 131, three flip-flops 132, 133 and 134, and a NOR gate 135 complemented by an inverter 136. The operation of logic circuit 130 will now be described with reference to FIG. 3c. The leading edge of the pulses constituting signal S0 applied at input S of bistable 132 sets output $Q_{132}$ in high level the trailing edges of signal $\overline{E2}$ (E2 complemented by inverter 131) applied at input C of the bistable sample the level of input D, which is referenced to the low level. The leading edge of the pulses of signal S0, which is also applied at input S of flip-flop 133 sets output $Q_{133}$ of the latter in high position; the trailing edges of signal $\overline{E2}$ (signal E2 complemented by inverter 131) applied at input C sample the level of input D which is connected to output $Q_{132}$, thus permitting the reseting of flip-flop 133 in low level. Input D of bistable 134 is sampled at its input C by the trailing edges of the square pulses constituting signal E2, input D of bistable 134 being connected to output $\overline{Q}$ of flip-flop 133; consequently, output Q of flip-flop 134 is moved to high level by square pulses E2.2 and to low level by square pulses E2.$\alpha$ and E2.1. The logical conjunction at three-input NOR gate 135, whose output is complemented by inverter 136, of the three signals E2, $\overline{Q}_{133}$ and $Q_{135}$ supplies signal S2, the leading edges of signal S2 supplying the effective synchronization signals of the automatic advance circuits.

The logic circuits which have just been described may also easily be put together from integrated logic components, such as NAND or OR gates and D type flip-flops available commercially in standard packaging.

Figure 4:
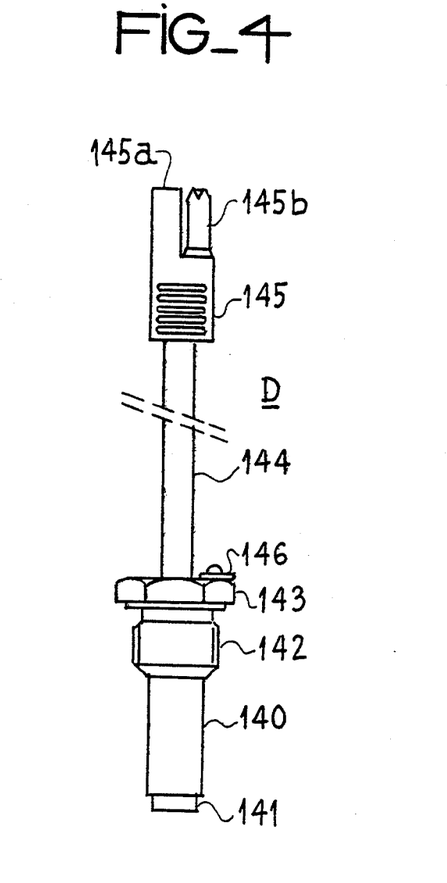
FIG. 4 represents, in side view, an illustrative detector.

FIG. 4 represents an illustrative configuration of detectors D1 and D2 of a sensor according to the invention; these two detectors are identical and are advantageously of the proximity detector type using a high frequency oscillator whose oscillating circuit is damped by the proximity of a metallic object. A detector D is made up of:

(1) a hollow metallic body 140, within which are placed the electronic circuits, including, in protruding form, oscillating circuit 141. The body 140 is made up of: a means for positioning 142 to the flywheel's casing; this positioning means may comprise, for example, a threaded base and a screwing mechanism 143, such as, for example, a hexagonal nut;

(2) an electric connection including: a bifilar cord 144 terminating in a current intake 145 and having an output signal 145a and a power supply intake 145; and a riveted lug 146 which may be connected, if necessary, to the electric ground of the engine.

The electronic circuits of the proximity detector, which are known per se, will not be described, as they are commercially available in accordance with an integrated technology.

An application of a shaft position sensor to a system of electronic ignition will now be described.

Figure 5:
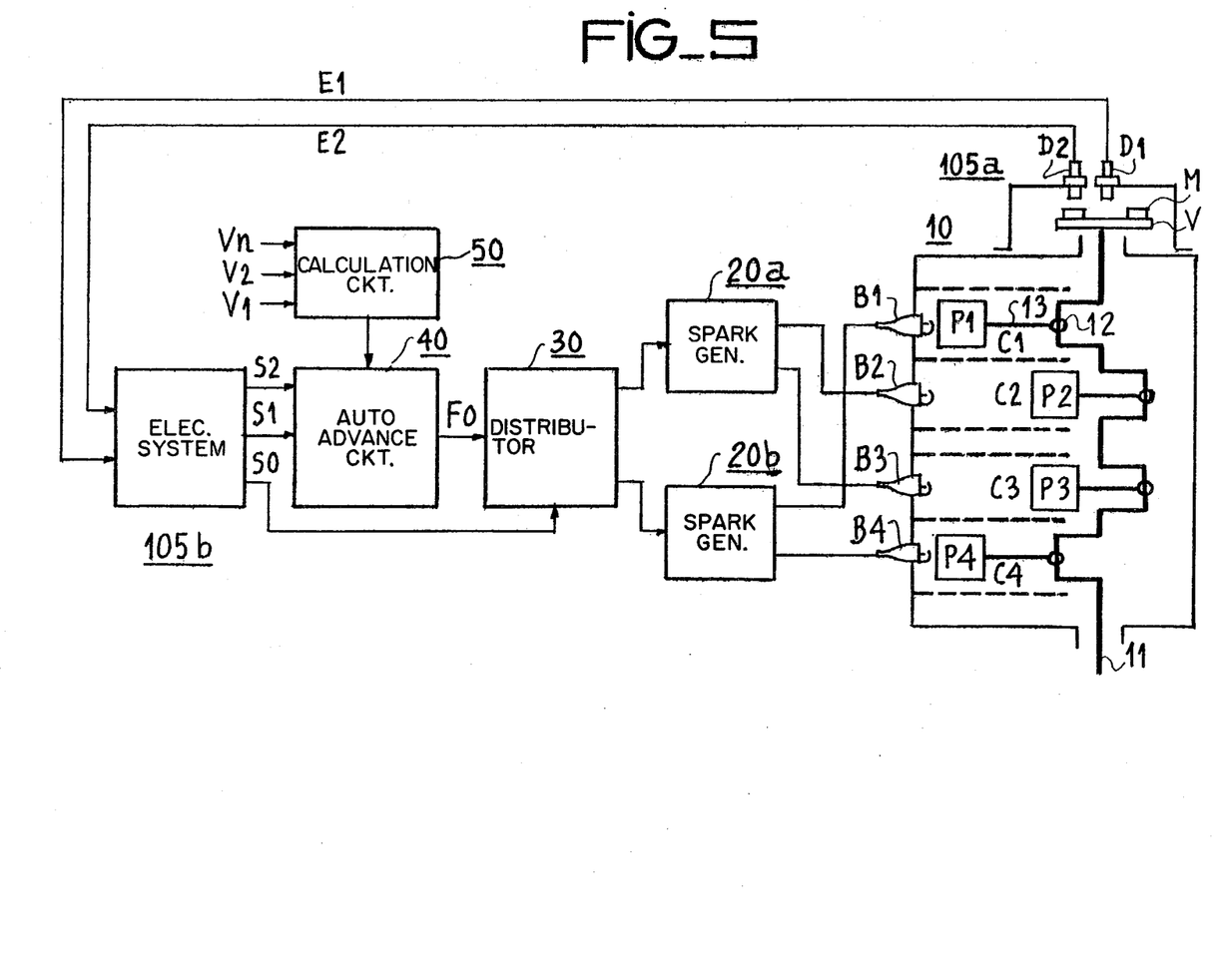
FIG. 5 represents, in the form of a schematic diagram, an example of the application of a sensor according to the invention to a four-cylinder engine equipped with an electronic ignition system.

FIG. 5 represents, in the form of a block schematic diagram, a complete electronic ignition system for a four-cylinder combustion engine into which is integrated an electromechanical system 105a according to the invention.

Engine 10 contains four cylinders C1 to C4 shown in dotted lines. Four spark plugs B1 to B4 are placed in these cylinders; the crankshaft 11 has four crankpins 12 which move four connecting rods 13 connected to the four pistons P1 to P4, pistons P1 and P4 constituting a first group of pistons and pistons P2 and P3 constituting a second group of pistons. It will be assumed that the ignition cycle of the engine corresponds to the sequence 1, 3, 4, 2.

Crankshaft 11 moves a flywheel V on which is arranged a set of members, for example, the three members shown in FIG. 2a.

Detectors D1 and D2, already described and shown in FIG. 4, are set on the protective casing of the flywheel; the output signals of these detectors are applied to the inputs of the electronic system 105b of the sensor. This electronic system supplies synchronization signals S0, S1 and S2, as already described. Two symetrical outputs spark generators 20a and 20b feed the plugs, the two outputs of generator 20a being connected to plugs B1 and B4 of the first group of pistons and the two outputs of generator 20b being connected to plugs B2 and B3 of the second group of pistons.

Electronic distributor 30 ensures the sequential firing, in cycle, of spark generators 20a and 20b. The electronic distributor has two inputs, one input to receive the firing impulses F0 supplied by automatic advance circuit 40 to the ignition. The timing circuit also has two outputs, corresponding to the two possible states, the first output supplying firing impulses F1 to generator 20a and a second output supplying firing impulses F2 to generator 20b. The automatic advance circuit 40 makes it possible, below a given rotation speed N0 of the engine, to transfer directly the leading edges of the pulses comprising input signal S1 to output F0, and, above rotation speed N0, to transfer to output F0, with a lag which is a function of the engine's running speed, the leading edges of the pulses which comprise input signal S2. The duration of the delay introduced by circuit 30 is controlled by an advance order signal $V_\phi$ computed by a calculation circuit 50. This calculation circuit may be of a known type and permits the conversion of the input measuring signals V1, V2 ... Vn, representing the engine's operating conditions into a lead/lag signal $V_\phi$.

The configuration of the metallic members of a shaft position sensor according to the invention must, of course, be adapted to conform to the number of two-cylinder groups included in the engine.

Figure 6:
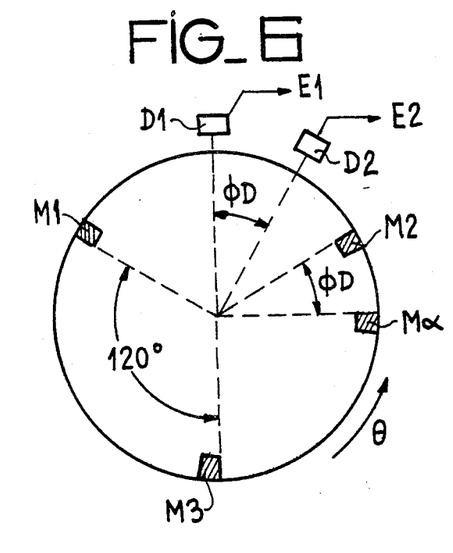
FIG. 6 represents, in schematic form, the configuration of the electromechanical system of a sensor intended for an engine utilizing three groups of two cylinders.

For illustrative purposes, FIG. 6 represents, in schematic form, the electromechanical means 105a of a shaft position sensor, according to the invention, which is intended for a six cylinder enging comprising three groups of two cylinders. This sensor makes it possible to synchronize an electronic ignition system comprising double-channel automatic advance circuits, a three-state electronic distributor and three symetrical outputs spark generators. The set of members M, all identical, includes the main members M1, M2 and M3 whose relative angular spacing is equal to 120°. As shown, the auxiliary member $M\alpha$ is angularly displaced by an angle $\phi_D$ equal to the angle of relative spacing of the two detectors D1 and D2, the size of this angle $\phi_D$ having a value at least equal to the greatest angle of advance to be controlled. The electronic system of the sensor is not shown in FIG. 6 as it is identical to that shown in FIG. 2a.

It will be recalled that when the members are rotated by direct action of the engine's crankshaft it is always necessary to utilize a symetrical output spark generator. The configuration for an electromechanical system adapted to an eight-cylinder engine is directly deducible from what has been described above.

The configuration for the electromechanical means for a shaft position sensor according to the invention must be modified when the members are rotated by the engine's came shaft because the speed of revolution of the came shaft is equal to the half value of that of the crankshaft.

Figure 7:
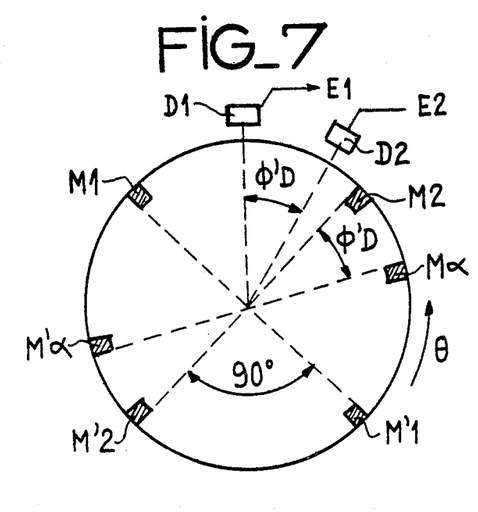
FIG. 7 represents, in schematic form, the configuration of the mechanical system for a sensor whose members are rotated by the engine's timing shaft.

For illustrative purposes, FIG. 7 represents in schematic form the configuration of the electromagnetic means 105a of a shaft position sensor intended for a four-cylinder engine equipped with an ignition system including two paired secondary spark generators. The set of members is made up of a first pair of main members M1 and M'1, diametrically opposed, and a secondary pair of identical main members, orthogonal to the first pair. The auxiliary members $M\alpha$ and $M'\alpha$, identical to the main members, are angularly displaced by an angle $\phi'_D$ whose value is equal to half of angle $\phi_D$. The electronic system 105b of the sensor as described above in FIG. 2b remains the same. When the engine is equipped with four single output spark generators (one of the secondary outputs being connected to ground), one of the members $M\alpha$ or $M'\alpha$ must be eliminated and a electronic distributor for the firing signals for the spark generators which can handle four states must be utilized. The configuration of the electromechanical system for a multicylinder engine is directly deducible from what has been described above.

The advantages provided by a shaft position sensor of the kind described in its applications to multicylinder internal combustion engines can now be seen more clearly. The elements of the sensor's electromechanical system are sturdy, and therefore perfectly adapted to the requirements of the internal combustion engine industry. Further, the configuration of the electromechanical system can be adapted to different types of multicylinder engines. Lastly, the electric signals supplied by the sensor are compatible with the various systems of electric ignition in existence.

The invention is not limited in its applications to the synchronization of the circuits of an electronic ignition system; for example, the sensor's output signals can be used to provide information on the engine's speed of rotation on an automobile's dash board, or these signals can be supplied to one or several angular speed discriminators so as to indicate the engine's various speeds of rotation.

The invention has applications in the traction engine and fixed engine industries.

Figure 8:
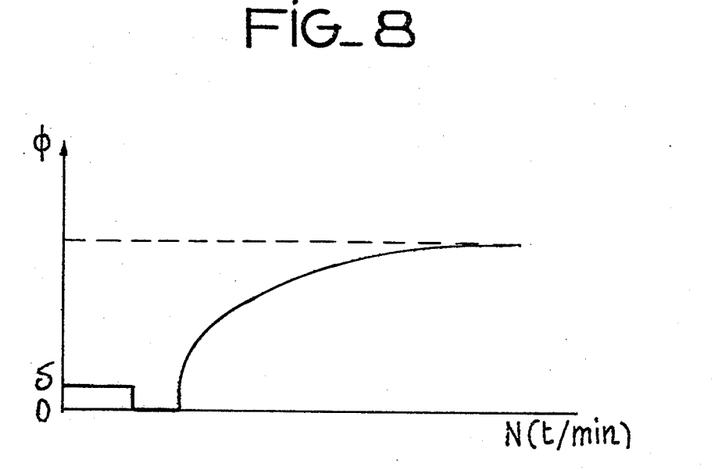
FIG. 8 is a graph which shows the ignition advance, as a function of speed of rotation, for a typical engine.

In the piston position sensor just described, the auxiliary metallic member $M\alpha$ is angularly displaced behind the associated main member M2. In an alternate embodiment, member $M\alpha$ may be angularly displaced ahead of the associated main member M2. In any electronic ignition system for an internal combustion engine, there is always the possibility of electromagnetic interference between the spark generators at the output of the system and the piston position sensor which comprises one of the input elements of the system. This electromagnetic interference generates interfering electric signals when the current passing through the primary winding of the high tension coils which are connected to the engine's spark plugs is interrupted. In some internal combustion engines, the size of the static lead angle may be positive and minimal dynamic lead angle may be zero or even negative, corresponding to a lag in the engine's ignition. This is shown in FIG. 8, which represents in the form of a curve, a typical lead versus engine rotation speed graph.

A description will now be given of an alternate position sensor in which the auxiliary member is angularly displaced ahead of the associated main member, this sensor comprising in addition means for inhibiting the effect of interfering signals induced by electromagnetic emission from the spark generators.

Figure 9:
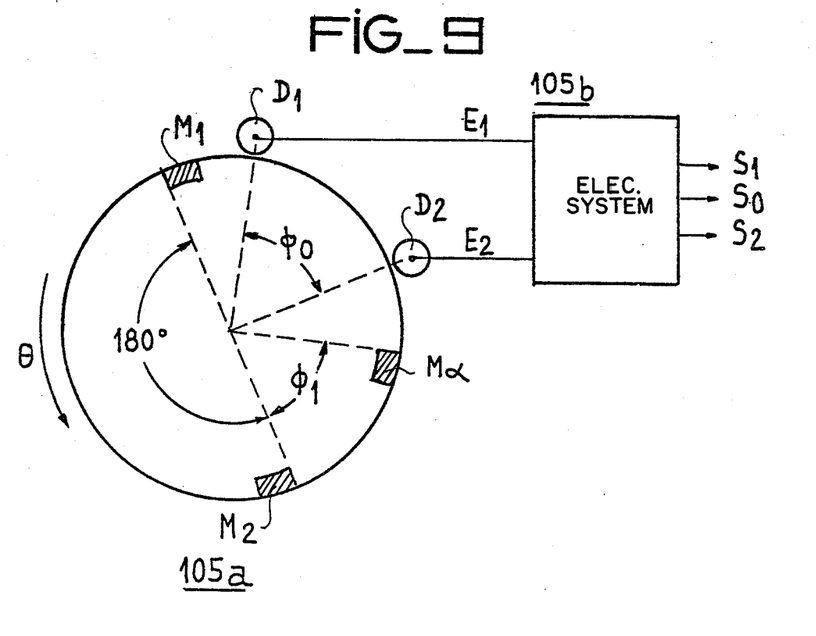

FIG. 9 represents an alternate embodiment of a position sensor according to the invention. This sensor makes it possible to synchronize the ignition advance circuits and the electronic distributor of an electronic ignition system intended for use with a four-cylinder, internal combustion engine. As shown, this sensor comprises:

(1) an electromechanical sensing means 105a including a set of conducting members arranged on a disc synchronously rotated by the engine's crankshaft. The set comprises diametrically opposed main members M1 and M2 and an auxiliary member $M\alpha$ set angularly ahead of the associated member M2 by a quantity $\phi_1$, the direction of rotation of the disc being shown by the arrow. The sensing means also comprises a pair of detectors D1 and D2 arranged in an ordered manner with respect to the length of stroke of the members, the relative angular spacing $\phi_1$ of the two detectors being substantially equal to angle $\phi_0$. Detectors $D_1$ and $D_2$ respectively deliver output signals E1 and E2 at the moment of passage of the members therebelow; and (2) an electronic processing means 105b for processing the output signals E1 and E2 from detectors D1 and D2 including a coincidence circuit connected to the source signals E1 and E2, said coincidence circuit supplying output signal S0 thereby making it possible to synchronize the electronic distributor, and in addition circuits for inhibiting the signals which result from the passage of member Mα past detectors D1 and D2.

The relative angular spacing $100_1$ between members M2 and Mα can, with advantage, be made greater than angle $\phi_0$.

Figure 10:
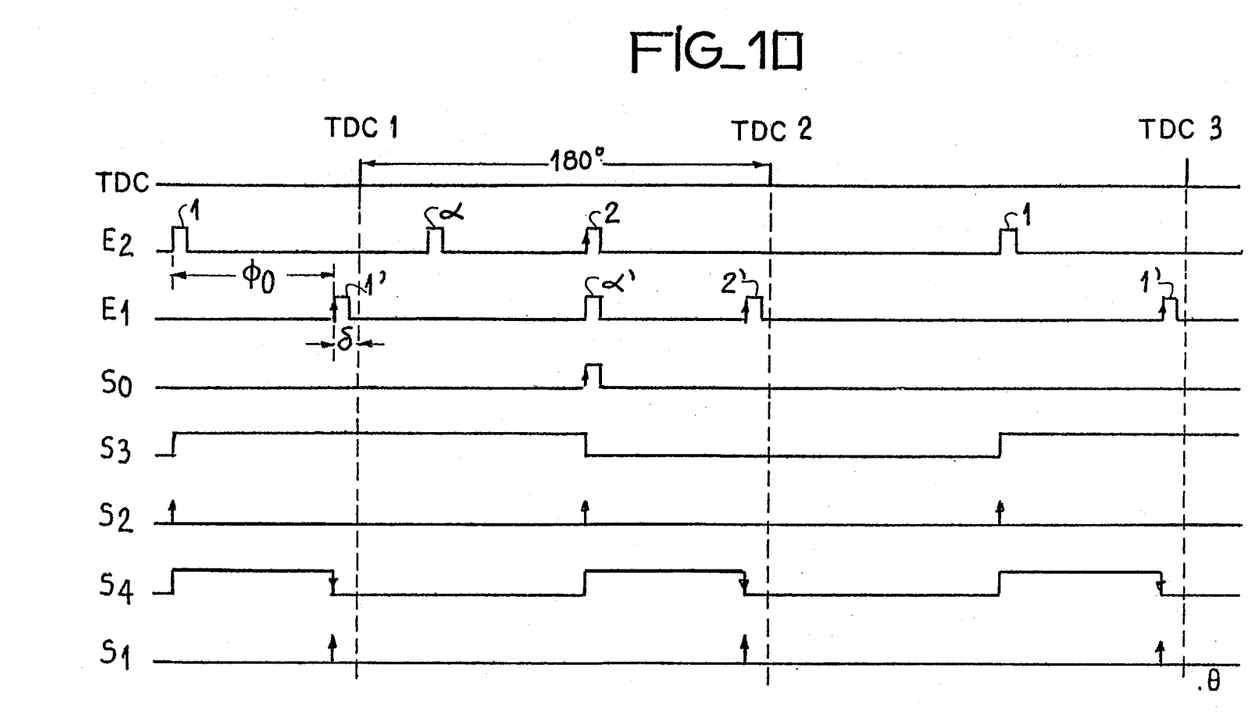
FIG. 10 shows the timing diagrams of the principle signals associated with the sensor shown in FIG. 8.

FIG. 10 represents the timing diagrams of the principal signals associated with the sensor shown in FIG. 9, referred to the TDC of the pistons. Signals E1 and E2 are substantially identical, their relative angular displacement being equal to the value $\phi_0$ pulses 1' and 2' of signal E1 are displaced ahead of the static lead angle δ. Signal S0 is the result of the temporal coincidence pulses 2 and α' and signals S2 and S1 are made up of pulses which coincide with the leading edges of pulses 1, 1' and 2, 2'.

Figure 11:
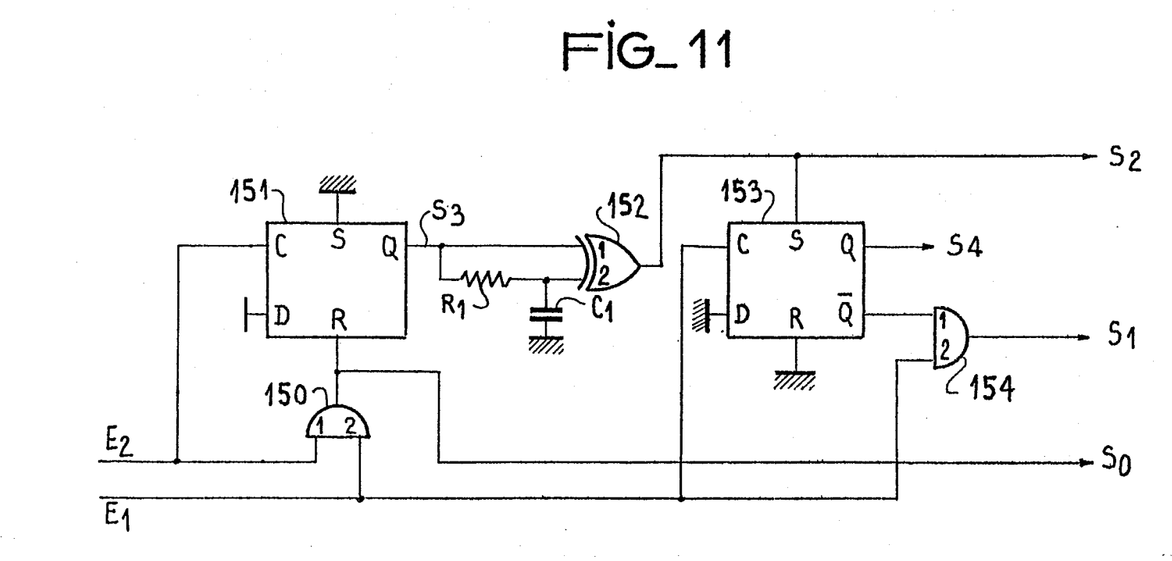
FIG. 11 shows an illustrative embodiment of a signal processing circuit for the sensor shown in FIG. 9.

FIG. 11 represents an illustrative embodiment of the sensing means 105b for the output signals E1 and E2 from position sensor 105a as shown in FIG. 9. The illustrative embodiment includes:

(1) a first AND-gate 150 receiving on a first input, output E2 from detector D2 and, on a second input, output signal E1 from detector D1. AND-gate 150 supplies signal S0 to synchronize the electronic distributor of the ignition system;

(2) a first D type flip-flop 151 in which the data input (D) is polarized at the "high" level, the clock input (C) receiving signal E2 while the reset input (R) is connected to logic gate 150;

(3) a detection circuit for detecting changes in the level of the output signal on output Q of circuit 151, this detection circuit comprising a logic gate 152 of the EXCLUSIVE-OR type, the two inputs of this gate being connected to output Q of circuit 151, the first input directly, the second through a delay circuit formed by a resistor R1 and a capacitator C1. Detection circuit supplies output signal S2 in pulses making it possible to synchronize the automatic circuits;

(4) a second D type flip-flop 153 in which the data input (D) is polarized at the "low" level, the clock input (C) receiving signal E1 and the set input (S) being connected to the output of logic gate 152;

(5) a second AND-gate 154, in which a first input is connected to output Q of circuit 153 and a second input receives the signal E1; this logic gate supplies the pulse signal S1 making it possible to fire the spark generators at the static lead point.

The operation of the circuit shown in FIG. 11 will now be described, with reference to the timing diagrams in FIG. 10.

Signal S0 results from the temporal coincidence of pulses 2 and α' of the signals E2 and E1. Output Q of circuit 151 is positioned at the "high" level by the leading edges of the pulse 1 of the signal E2 and positioned at the "low" level by the leading edges of signal S0, the resulting signal S has an angular duration of 180°. Signal S3 is differentiated by logic gate 152 to supply signal S2 as synchronization pulses for the automatic advance circuits. Output Q of circuit 153 is set at the "high" level by the signals S2 and set at the "low" level by the leading edges of signal E1, thereby to supply signal S4.

Finally, the conjunction made by logic gate 154 generates signal S1. It is now possible, to see more clearly the functions of the processing circuit: first, to derive a signal for synchronizing the engine's ignition cycle, and second to eliminate the signals α and α' resulting from the passage of member Mα past detectors D1 and D2.

Figure 12:
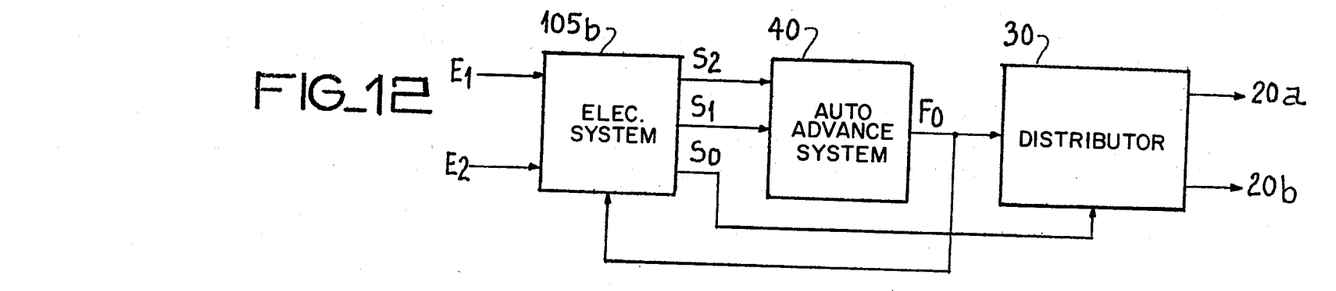
FIG. 12 represents, in the form of a synoptic diagram, an alternative embodiment of an electronic ignition system equipped with a shaft position sensor according to the invention.

An electronic means for inhibiting interfering signals induced at the output of detectors D1 and D2 by the emissions of the coils of spark generators 20a and 20b will now be described. Referring to FIG. 12, which partially represents the electronic ignition system described with reference to FIG. 5, it will be seen first that signal S0 supplied by element 105b controls electronic distributor 30 and second, that output signal F0, supplied by automatic advance circuit 40 to the ignition, is connected to treatment circuit 105b in order to inhibit signals E1 and E2, supplied respectively by detectors D1 and D2 of sensor 105a during the time interval which corresponds to the duration of the interfering signals resulting from ignition sparks.

Figure 13:
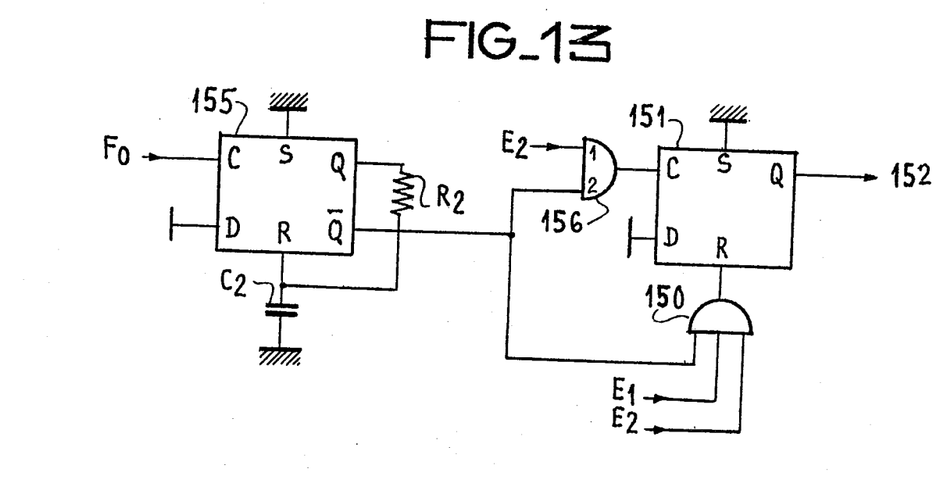
FIG. 13 represents an alternate embodiment of the electronic circuit for inhibiting interfering signals resulting from electromagnetic emissions from the spark generators.

FIG 13 represents, in the form of an electrical diagram, an illustrative embodiment of the circuit which inhibits the interfering signals. This circuit comprises:

(1) a "D" type flip-flop circuit 155 wherein the data input (D) is polarized at the "high" level, the clock input (C) receives the output signal F0 supplied by the automatic advance circuit 40, output Q is connected, through a delay network, to the reset input (R) thereby to establish a monostable circuit whose duration is proportional to the product of the value of resistance R2 and capacitor C2;

(2) an AND-gate 156 wherein a first input receives signal E2 and a second input is connected to the $\overline{Q}$ output of flip-flop 155, the output of gate 156 being connected to clock input (C) of circuit 151, as described above;

(3) an AND-gate 150 having first and second inputs connected to signals E, and E2 respectively and an output connected to the reset input of flip-flop 151.

Logic gate 150, described above, includes a third input connected to the $\overline{Q}$ output circuit 155.

In practice, the duration of the inhibiting signal generated by circuit 155 may be on the order of a millisecond, which corresponds substantially to the duration of the engine's sparks.

It may be noted that, in the case of a four-cylinder engine, the electronic distributor may comprise two AND-gates directly controlled by signal S3.

The advantages offered by a sensor in which the auxiliary member is displaced ahead of the associated main member can now be seen more clearly, i.e.: the circuit which makes it possible to inhibit the electric signals resulting from the passage of the auxiliary member past the pair of detectors is relatively simple, and the interfering signals resulting from electromagnetic emissions from the spark generators are completely eliminated and cannot disturb the operation of the automatic advance circuits and the electronic distributor.

The particular circuitry for the signal processing circuits for the output signals generated by the detectors may vary in view of the fact that the type of flip-flop circuits and logic gates used may vary according to the type of logic adopted.

I claim:

1. A shaft position sensor for synchronizing the electronic ignition system of a multicylinder internal combustion engine said electronic ignition system comprising at least one double-channel automatic advance circuit, an electronic distributor, and a plurality of spark generators connected to respective ones of the spark plugs mounted in said cylinders, said sensor comprising:

(1) electromechanical sensing means including: a set of conducting members, rotated synchronously about an axis of rotation of the engine, said set of members including at least two main members and at least one auxiliary member angularly displaced ahead of one of the main members by a given angle; and first and second fixed proximity detectors, spatially disposed with regard to the course of the members, the relative angular spacing of said detectors being equal to the difference between the value of the maximum dynamic lead angle and the value of the static lead angle; and, (2) electronic means for processing the signals generated by said detectors, said processing means including: a temporal coincidence circuit connected to the output signals of said detectors; and a circuit for inhibiting the electric signals resulting from the passage of said auxiliary member past said detectors.

2. A sensor according to claim 1 wherein said signal processing includes means for inhibiting interfering signals generated electromagnetically by said spark generators, said inhibiting means being connected to and activated by the output signal of said electronic automatic advance circuit.

3. A sensor according to claim 2 wherein said inhibiting means includes a monostable flip-flop whose duration is substantially greater than the duration of the interfering electric signals, said monostable flip-flop having a control input connected to the output of said automatic advance circuit and an output connected to the common inputs of first and second AND-gates, the inputs of which are connected to the outputs of said detectors.

4. A sensor according to claim 1 wherein said circuit for inhibiting the signals resulting from the passage of said auxiliary member past said detectors include:

a first flip-flop circuit held in a first state by the output signal of said second detector and moved to the second, complementary state by the output signal of said temporal coincidence circuit;

a differentiating circuit connected to the output of said first flip-flop circuit;

a second flip-flop circuit held in a first state by the output signal of said first detector and moved to the second, complementary state by the output signal of said differentiating circuit;

an AND-gate with two inputs, the first input being connected to the output of said second flip-flop and the second input being connected to the output of said first detector.

5. A sensor according to claim 4 wherein the output signal of said first flip-flop comprises the control signal for said electronic distributor.

* * * * *